United States Patent [19]

Gwyn

[11] Patent Number: 5,351,482
[45] Date of Patent: Oct. 4, 1994

[54] METHOD OF MAINTAINING CATALYTIC CONVERTER ACTIVITY IN GASOLINE VEHICLES

[75] Inventor: John E. Gwyn, Katy, Tex.

[73] Assignee: Shell Oil Company, Houston, Tex.

[21] Appl. No.: 875,182

[22] Filed: Apr. 28, 1992

[51] Int. Cl.$^5$ .............................................. F01N 3/20
[52] U.S. Cl. ........................................ 60/274; 60/295; 60/310; 422/178; 423/213.2; 423/213.5
[58] Field of Search .................... 60/295, 274, 310; 422/178; 423/212, 213.2, 213.5

[56] References Cited

U.S. PATENT DOCUMENTS

| | | |
|---|---|---|
| 1,277,605 | 9/1918 | Knottenbelt . |
| 2,302,281 | 11/1942 | Watkins . |
| 3,556,734 | 1/1971 | Peterson ................................ 60/295 |
| 3,900,554 | 8/1975 | Lyon . |
| 4,107,272 | 8/1978 | Mori et al. . |
| 4,220,632 | 9/1980 | Pence et al. . |
| 4,423,017 | 12/1983 | Dean . |
| 4,434,147 | 2/1984 | Dimpfl et al. . |
| 4,438,082 | 3/1984 | Dettling et al. . |
| 4,469,662 | 9/1984 | Hamada et al. . |
| 4,516,990 | 5/1985 | Erdmannsdörfer ..................... 60/295 |
| 4,670,233 | 6/1987 | Erdmannsdoerfer .................. 60/295 |
| 5,224,346 | 7/1993 | Berriman ................................ 60/274 |

FOREIGN PATENT DOCUMENTS

| | | |
|---|---|---|
| 0381236A1 | 8/1990 | European Pat. Off. . |
| 3615705A | 11/1987 | Fed. Rep. of Germany . |
| 2214524-A | 8/1990 | Japan . |
| 336515 | 10/1930 | United Kingdom . |

*Primary Examiner*—Douglas Hart
*Attorney, Agent, or Firm*—Timothy J. Hadlock

[57] ABSTRACT

The invention includes a method of reducing hydrocarbon emissions from electronic port fuel injected engines by feeding to the catalytic converter an amount effective to reduce hydrocarbon emissions from the engines of chlorine or a chlorine compound.

15 Claims, No Drawings

METHOD OF MAINTAINING CATALYTIC CONVERTER ACTIVITY IN GASOLINE VEHICLES

FIELD OF THE INVENTION

This invention relates to a method of maintaining catalytic converter activity and reducing hydrocarbon emissions in gasoline powered vehicles.

BACKGROUND OF THE INVENTION

Environmental concerns indicate the emission of hydrocarbons to the atmosphere should be reduced. Uncombusted hydrocarbons are emitted from gasoline engine automobiles since the gasoline combustion process is not complete and all the gasoline does not combust. Catalytic converters are now present on most gasoline automobiles. The converter catalytically reacts uncombusted hydrocarbons to reduce emissions. The converter loses activity over time, becomes less efficient, and permits hydrocarbon emissions.

Chlorine can aid in maintaining catalyst activity by maintaining the dispersion of platinum and improving the acidity of the alumina support. Adding to the catalyst during the manufacture of the catalytic converter is of limited value since the chlorine content is leached out over time due to chlorine reacting by way of the Deacon reaction with water in the exhaust gases. It would be advantageous to have a gasoline composition and method which maintained catalyst activity thus resulting in little or no hydrocarbon emissions.

SUMMARY OF THE INVENTION

By adding a chlorine source to certain portions of a gasoline combustion system the hydrocarbon emissions from gasoline powered vehicles is reduced or eliminated. This result occurs due the increased activity of the catalyst in the catalytic converter. Accordingly, the present invention is a method of reducing hydrocarbon emissions from a gasoline combustion system wherein said system comprises a combustion chamber, exhaust manifold, catalytic converter, and exhaust pipe, i.e., a conduit for flow of exhaust gases between the exhaust manifold and the catalytic converter. The method is feeding at a point upstream of the catalytic converter, i.e., such that the chlorine goes to the catalytic converter, an amount of a chlorine source effective to reduce hydrocarbon emissions from the gasoline combustion system. A composition to be used in one embodiment of this method is an unleaded fuel composition containing a major amount of a hydrocarbon base fuel of the gasoline boiling range containing an effective amount to reduce hydrocarbon emissions from electronic port fuel injected engines of chlorine or a chlorine compound.

DETAILED DESCRIPTION OF THE INVENTION

One aspect of the present invention is a method of reducing hydrocarbon emissions from a gasoline combustion system wherein said system comprises a combustion chamber, exhaust manifold, catalytic converter, and exhaust pipe, a conduit for flow of exhaust gases between the exhaust manifold and the catalytic converter. The method is feeding at a point upstream of the catalytic converter an effective amount of a chlorine source to reduce hydrocarbon emissions from the gasoline combustion system.

Another aspect of the invention is a composition to use in one embodiment of the method, for example when the chlorine or chlorine compound is fed to the combustion chamber. The composition is an unleaded fuel composition containing a major amount of a hydrocarbon base fuel of the gasoline boiling range containing an amount effective to reduce hydrocarbon emissions from electronic port fuel injected engines of chlorine or a chlorine compound. A representative concentration of chlorine or chlorine compound expressed as $Cl_2$ is from about 750 ppmw to about 2250 ppmw based on the gasoline weight.

A chlorine source may be used to jointly refer to either chlorine or chlorine compounds which liberate chlorine when heated. The chlorine source is chosen from chlorine or any chlorine compound which is soluble in gasoline and which decomposes under gasoline engine combustion chamber conditions or in the exhaust gases prior to reaching the catalytic converter. These compounds include olefin chlorides and ammonium chlorides, for example, ammonium chloride, ammonium chlorate, ammonium perchlorate, and ethylene chloride. A preferred compound is ethylene chloride.

The chlorine source is added anywhere upstream of the catalytic converter. For example, it is added to the combustion chamber by metering the chlorine source through a restriction orifice or by addition to the gasoline. In an alternative embodiment the chlorine source is added at the exhaust manifold or anywhere between the exhaust valves and catalytic converter.

When added to gasoline the chlorine source is preferably a chlorine compound which is added at any point after the refining process, but preferably at the same time other additives, e.g., oxidation stabilizers or deposit reducers, are added. Such additives are typically added at the distribution terminal, i.e., the storage facilities from which the gasoline is distributed by truck to individual service stations. Since perchlorates are oxidizers caution should be taken in handling them.

The invention also includes a method of reducing hydrocarbon emissions from electronic port fuel injected engines by feeding to the engine exhaust gases at a point between the outlet valves and catalytic converter an amount effective to reduce hydrocarbon emissions from tile engines. A representative concentration of a chlorine source expressed as $Cl_2$ is from about 50 ppmw to about 150 ppmw based on the weight of the gasoline/air mixture combusted. Where a chlorine compound is used it is chosen such that it will decompose in the exhaust gas at or before reaching the catalytic converter. The catalyst promotes the desired reactions to combust the hydrocarbons. The temperatures in the exhaust are slightly less than those in the combustion chamber and decrease as they proceed toward the catalytic converter. The compounds for use with this method include the same compounds listed above as additives to the gasoline. Thus compounds which decompose at lower temperatures are preferred if introduced closer to the catalytic converter. Preferred compounds for injection to the exhaust gases are chlorine and ethylene chloride.

The chlorine source is kept in a canister in liquified form and is injected through a restriction orifice. Such restriction orifices for injecting parts per million levels of liquids are known in the art. An electronically linked valve, for example, is used to open the restriction orifice when the vehicle is started. If solid chlorine compounds are used they are dissolved in a solvent for storage in the canister. A canister should be a size sufficient to necessitate replacement with a fresh canister only about every six months. The canister should be placed in the engine compartment or underbody according to the boiling point of the chlorine compound solution, pressure capacity of the container/canister, and the temperature levels of the engine compartment and underbody during operation of the vehicle.

ILLUSTRATIVE EMBODIMENTS

In one illustrative embodiment, between 750 ppmw and 2250 ppmw based on the gasoline weight of a chlorine compound expressed as $Cl_2$ will be admixed with gasoline. The gasoline will then be combusted in a fuel-injected gasoline engine and the hydrocarbon emissions will be measured over the life of the vehicle, e.g., 50,000 miles. The same gasoline, absent the chloride compound, will then be combusted in the same type engine and vehicle and the hydrocarbon emissions will be measured. In a test under the same operating time and conditions, the engine combusting the gasoline containing the chlorine compound will have lower hydrocarbon emissions.

What is claimed is:

1. A method of reducing hydrocarbon emissions in a gasoline engine vehicle equipped with a catalytic converter comprising feeding to said catalytic converter an amount effective to maintain catalytic converter activity to from about 50 ppmw to about 150 ppmw based on the gasoline/air mixture combusted of chlorine gas or a chlorine compound expressed as $Cl_2$.

2. The method of claim 1 wherein the chlorine compound is ammonium chloride.

3. The method of claim 1 wherein the chlorine compound is ammonium chlorate.

4. The method of claim 1 wherein the chlorine compound is ethylene chloride.

5. The composition of claim 1 wherein the chlorine compound is ammonium perchlorate.

6. A method of reducing hydrocarbon emissions in a gasoline engine vehicle equipped with a catalytic converter and exhaust outlet valves comprising feeding to the engine exhaust gases at a point between the exhaust outlet valves and catalytic converter an amount effective to maintain the catalytic converter activity of from about 50 ppmw to about 150 ppmw based on the gasoline/air mixture combusted of chlorine gas or a chlorine compound expressed as $Cl_2$.

7. The method of claim 6 wherein the chlorine compound is ammonium chloride.

8. The method of claim 6 wherein the chlorine compound is ammonium chlorate.

9. The method of claim 6 wherein the chlorine compound is ethylene chloride.

10. The composition of claim 6 wherein the chlorine compound is ammonium perchlorate.

11. A method of reducing hydrocarbon emissions in a gasoline engine vehicle equipped with a catalytic converter comprising combusting in the engine a gasoline composition comprising a major amount of a hydrocarbon base fuel of the gasoline boiling range containing an amount effective to maintain catalytic converter activity of from 750 ppmw to about 2250 ppmw based on the gasoline weight of chlorine or a chlorine compound expressed as $Cl_2$ perchlorate.

12. The method of claim 11 wherein the chlorine compound is ammonium chloride.

13. The method of claim 11 wherein the chlorine compound is ammonium chlorate.

14. The method of claim 11 wherein the chlorine compound is ethylene chloride.

15. The composition of claim 11 wherein the chlorine compound is ammonium perchlorate.

* * * * *